(12) United States Patent
Sohn et al.

(10) Patent No.: US 10,853,655 B2
(45) Date of Patent: Dec. 1, 2020

(54) MOBILE DEVICE WITH ACTIVITY RECOGNITION

(71) Applicant: NEC Laboratories America, Inc., Princeton, NJ (US)

(72) Inventors: Kihyuk Sohn, Fremont, CA (US); Manmohan Chandraker, Santa Clara, CA (US); Xiang Yu, Mountain View, CA (US)

(73) Assignee: NEC CORPORATION

( * ) Notice: Subject to any disclaimer, the term of this patent is extended or adjusted under 35 U.S.C. 154(b) by 188 days.

(21) Appl. No.: 16/112,040

(22) Filed: Aug. 24, 2018

(65) Prior Publication Data

US 2019/0138812 A1  May 9, 2019

Related U.S. Application Data

(63) Continuation of application No. 16/111,298, filed on Aug. 24, 2018.

(60) Provisional application No. 62/550,914, filed on Aug. 28, 2017.

(51) Int. Cl.
  *G06K 9/62* (2006.01)
  *G06K 9/00* (2006.01)
  *G06K 9/46* (2006.01)
  *H04N 7/18* (2006.01)

(52) U.S. Cl.
  CPC ..... *G06K 9/00718* (2013.01); *G06K 9/00342* (2013.01); *G06K 9/00744* (2013.01); *G06K 9/00771* (2013.01); *G06K 9/46* (2013.01); *G06K 9/4628* (2013.01); *G06K 9/6231* (2013.01); *G06K 9/6259* (2013.01); *G06K 9/6262* (2013.01); *G06K 9/6267* (2013.01); *H04N 7/181* (2013.01); *G06K 2009/00738* (2013.01); *H04N 7/18* (2013.01)

(58) Field of Classification Search
  None
  See application file for complete search history.

(56) References Cited

U.S. PATENT DOCUMENTS

| | | | | |
|---|---|---|---|---|
| 2011/0289033 | A1* | 11/2011 | Gargi | G06K 9/00523 706/20 |
| 2014/0328570 | A1* | 11/2014 | Cheng | H04N 21/8549 386/241 |
| 2015/0310303 | A1* | 10/2015 | Andreopoulos | G06K 9/4652 382/158 |

(Continued)

OTHER PUBLICATIONS

Sohn, "Unsupervised Domain Adaptation for Face Recognition in Unlabeled Videos" IEEE International Conference on Computer Vision, Jul. 2017, pp. 1-9.

(Continued)

*Primary Examiner* — Mazda Sabouri
(74) *Attorney, Agent, or Firm* — Joseph Kolodka

(57) ABSTRACT

A computer-implemented method, system, and computer program product are provided for activity recognition in a mobile device. The method includes receiving a plurality of unlabeled videos from one or more cameras. The method also includes generating a classified video for each of the plurality of unlabeled videos by classifying an activity in each of the plurality of unlabeled videos. The method additionally includes storing the classified video in a location in a memory designated for videos of the activity in each of the classified videos.

16 Claims, 9 Drawing Sheets

(56) References Cited

U.S. PATENT DOCUMENTS

2018/0024968 A1* 1/2018 Clinchant ............ G06N 3/0454
                                                                                   706/12
2018/0359041 A1* 12/2018 Lee ...................... H04N 21/812
2019/0050996 A1* 2/2019 Abdelhak ............ G06K 9/6292

OTHER PUBLICATIONS

Carreira, "Quo Vadis, Action Recognition? A New Model and the Kinetics Dataset", IEEE Conference on Computer Vision and Pattern Recognition, Jul. 2017, pp. 6299-6308.

* cited by examiner

700

Receive a plurality of videos, the plurality of videos including labeled videos and unlabeled videos.
710

Extract, with a feature extraction convolutional neural network (CNN), frame features for frames from each of the plurality of videos.
720

Utilize a red-green-blue CNN.
722

Utilize a flow CNN.
724

Estimate, with a feature aggregation system, a vector representation for one of the plurality of videos responsive to the frame features.
730

Determine an average of the frame features.
732

Determine a weighted average of the frame features responsive to a weighting factor.
734

Classify an activity from the vector representation.
740

Control an operation of a processor-based machine to react in accordance with the activity.
750

FIG. 7

MOBILE DEVICE WITH ACTIVITY RECOGNITION

RELATED APPLICATION INFORMATION

This application claims priority to 62/550,914, filed on Aug. 28, 2017, incorporated herein by reference in its entirety. This application claims priority to Ser. No. 16/111,298, filed on Aug. 24, 2018, incorporated herein by reference in its entirety. This application is related to an application entitled "Surveillance System with Activity Recognition", and which is incorporated by reference herein in its entirety.

BACKGROUND

Technical Field

The present invention relates to activity recognition and more particularly recognizing activities in first-person videos without requiring large-scale labeled data.

Description of the Related Art

Several approaches on activity recognition on (third-person) videos are based on deep neural network that requires large-scale labeled data for training. Three-dimensional (3D) convolutional neural networks that extract features from multiple frames of red-green-blue (RGB) and/or optical flow images demonstrate state-of-the-art activity recognition performance on this task. Another approach is to learn additional temporal aggregation modules via recurrent neural networks (e.g., LSTM, GRU). These network architectures are developed under the assumption of large-scale labeled training data.

SUMMARY

According to an aspect of the present principles, a mobile device utilizing activity recognition is provided. The mobile device includes a processing system having a processor and memory coupled to the processor. The processing system programmed to receive a plurality of unlabeled videos from the one or more cameras. The processing system is also programmed to generate a classified video for each of the plurality of unlabeled videos by classifying an activity in each of the plurality of unlabeled videos. The processing system is additionally programmed to store the classified video in a location in the memory designated for videos of the activity in each of the classified videos.

According to another aspect of the present principles, a computer program product is provided for a mobile device with activity recognition. The computer program product comprising a non-transitory computer readable storage medium having program instructions. The program instructions executable by a computer to cause the computer to perform a method. The method includes receiving a plurality of unlabeled videos from one or more cameras. The method also includes generating a classified video for each of the plurality of unlabeled videos by classifying an activity in each of the plurality of unlabeled videos. The method additionally includes storing the classified video in a location in a memory designated for videos of the activity in each of the classified videos.

According to another aspect of the present principles, a computer-implemented method for activity recognition in a mobile device is provided. The method includes receiving a plurality of unlabeled videos from one or more cameras. The method also includes generating a classified video for each of the plurality of unlabeled videos by classifying an activity in each of the plurality of unlabeled videos. The method additionally includes storing the classified video in a location in a memory designated for videos of the activity in each of the classified videos.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein:

FIG. 7 shows a block diagram illustrating a method for activity recognition, in accordance with an embodiment of the present invention;

DETAILED DESCRIPTION OF PREFERRED EMBODIMENTS

Figure 1:
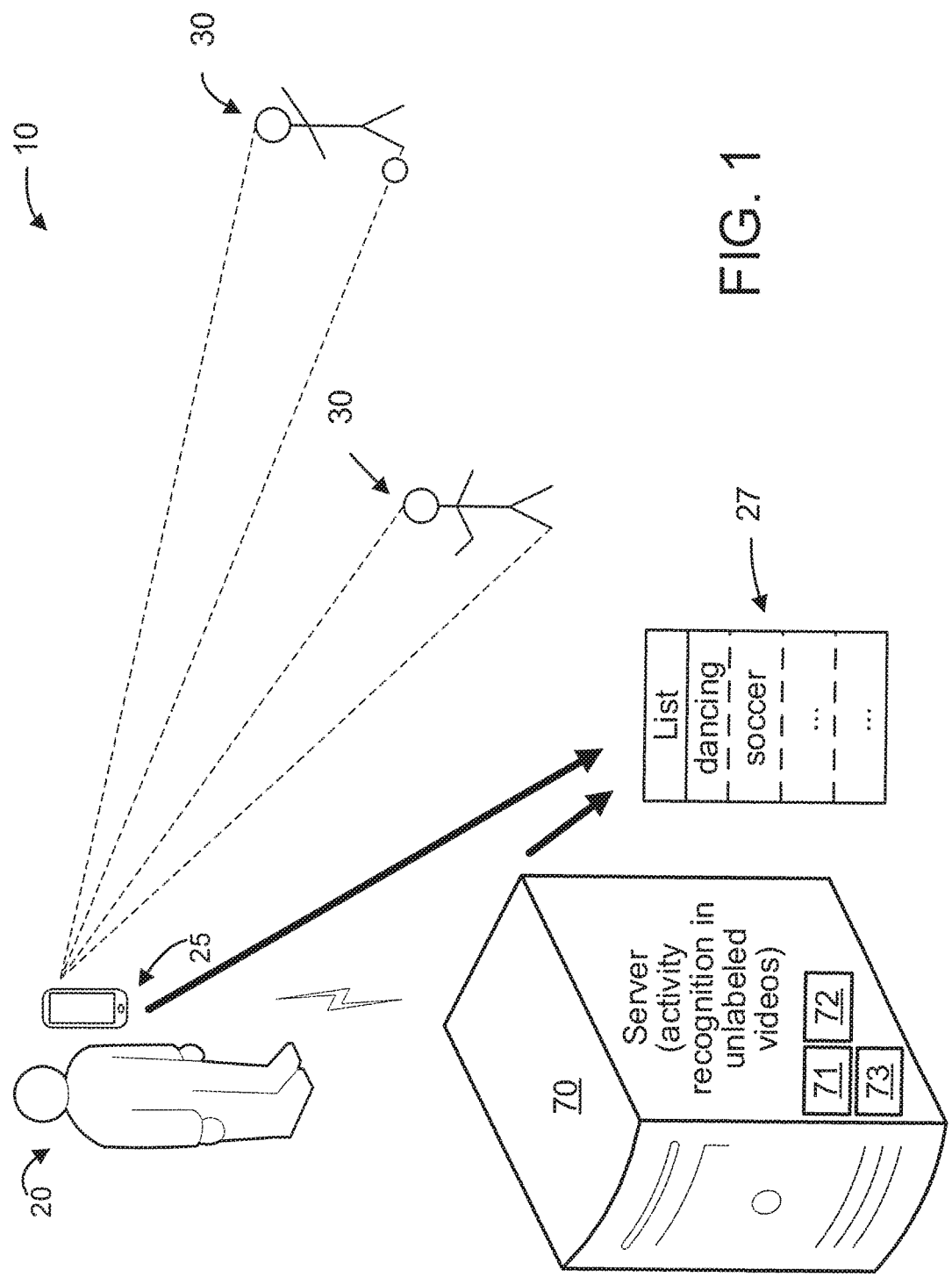
FIG. 1 shows an exemplary system for a mobile device with activity recognition, in accordance with an embodiment of the present invention.

In accordance with the present invention, systems and methods are provided to recognize activities in first-person videos without requiring large-scale labeled data, rather using labels only from third-person videos. Aspects of the present invention handle videos from any egocentric platform, such as vehicle-mounted, head-mounted, drone-mounted or wearable cameras. In one embodiment, activities in first-person videos can be recognized without requiring large-scale labeled data by developing domain adaptation technique between labeled third-person videos and unlabeled first-person videos. In another embodiment, a new end-to-end training framework is employed by designing a hierarchical adversarial objective where the adversarial training happens at either the frame-level or the video-level. In yet another embodiment, a new video representation is employed for activity recognition in first-person videos based on deep neural network followed by feature aggregation.

Aspects of the present invention utilizes unlabeled data from target domain, i.e., the first-person videos for training of recognition engine, and therefore generalizes better to the target domain.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Referring now in detail to the figures in which like numerals represent the same or similar elements and initially to FIG. 1, an exemplary system 10 for a mobile device with activity recognition is illustratively depicted in accordance with an embodiment of the present invention.

The system 10 includes a mobile device 25. In one embodiment, the mobile device 25 can be a smartphone with a camera. In another embodiment, the mobile device 25 can be a camera, an MP3 player with a camera, or a bodycam.

The mobile device 25 can be held by or mounted on a user 20. The mobile device 25 can be a wireless system having its own antenna(s). The system 10 can further include a server 70 configured to perform activity recognition in conjunction with the mobile device 25, while the mobile device 25 can also perform these functions without the server 70. Such activity recognition can be with respect to a secured object such as, for example, a facility 35. The facility 35 can be a secured facility or a non-secured facility. In the example of FIG. 1, the facility 35 is a secured facility implemented as an airport. Of course, other facilities (e.g., mass transit hub, sports complex, etc.) can also be monitored with respect to activity recognition in unlabeled videos in accordance with the present invention. The activity recognition can involve detecting the presence of objects 30 (e.g., persons), recognizing particular activity performed by the objects 30 and/or particular activity performed by one or more persons using the objects 30, and/or performing one or more activity (e.g., in response to activity recognition results). The server 70 can be located remote from, or proximate to, the mobile device 25. The server 70 can include a processor 71, a memory 72, and a wireless transceiver 73. The processor 71 and the memory 72 of the remote server 70 can be configured to perform activity recognition on videos received from the mobile device 25 by the (the wireless transceiver 73 of) the remote server 70. In this way, a list 27 of recognized activities can be provided for any of a myriad of possible application uses relating to activity recognition. Such application uses can involve one or more activity performed responsive to the list, as readily appreciated by one of ordinary skill in the art. For example, an alert (local and/or remote) can be provided, one or more doors and/or windows can be closed and locked to secure the person within a specific area or to keep the person from (out of) that specific area, a person containment procedure can be automatically performed, categorize the video based on the activity and store the video in an activity related location, and so forth.

Accordingly, some exemplary suitable environments to which the present invention can be applied can include any environments where activity recognition can prove useful such as parks, playgrounds, mass transit hubs, border crossings, subways, transportation hubs, airports, ship ports, sports facilities, and so forth. It is to be appreciated that the preceding environments are merely illustrative and, thus, other environments can also be used.

Any activity type of interest can be recognized, depending upon the implementation. For example, the activity may include, but is not limited to, one or more of the following: an intruder running up to a premises or an object; a projectile approaching the premises or the object; a sporting activity; a prohibited activity (e.g., holding a weapon in a place where weapons are prohibited except for, e.g., law enforcement, etc.); a potentially dangerous activity; and so forth. It is to be appreciated that the preceding activity s are merely illustrative.

Figure 2:
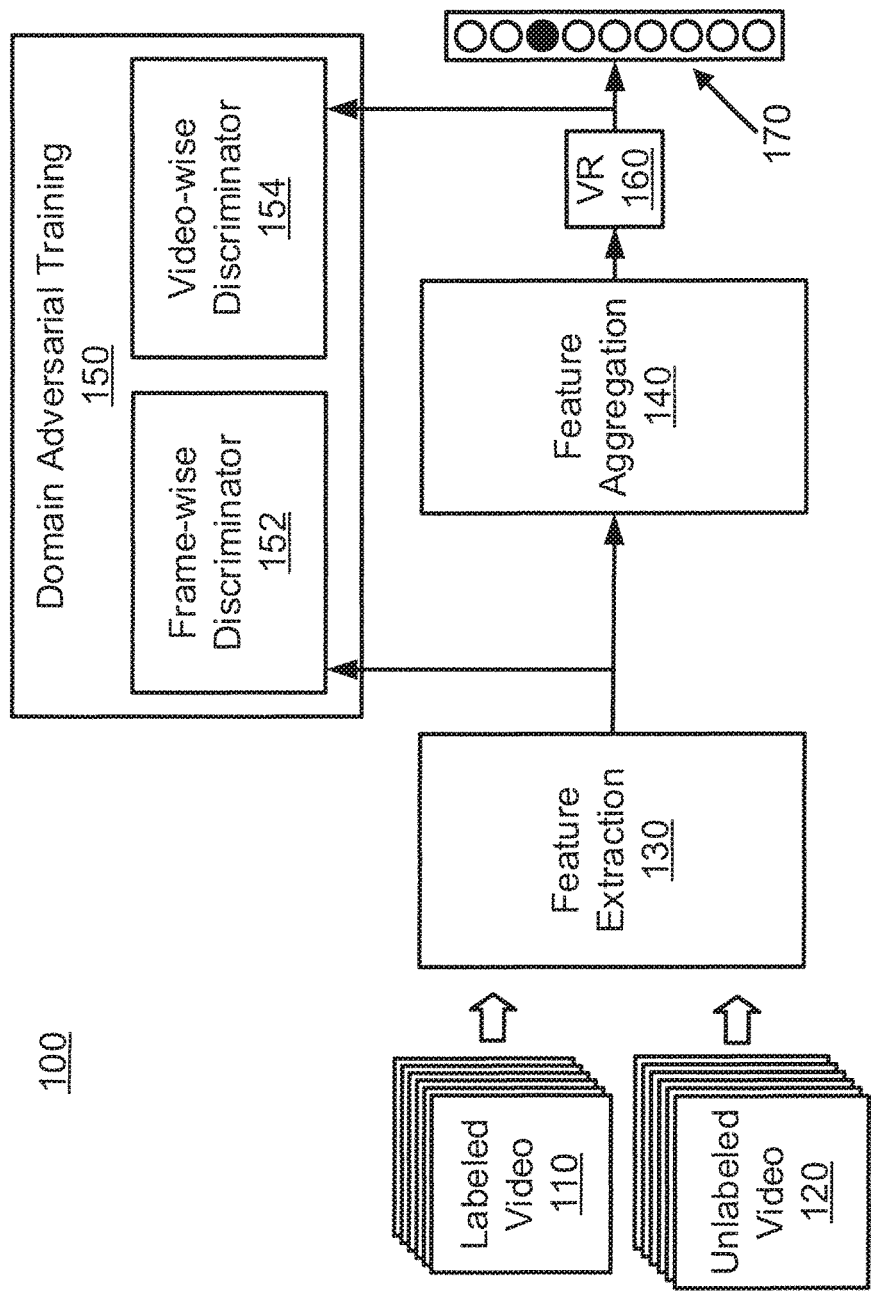
FIG. 2 is a block diagram illustrating a high-level system for activity recognition in video, in accordance with an embodiment of the present invention.

FIG. 2 shows a high-level system 100 for activity recognition in video, in accordance with an embodiment of the present invention. The activity recognition system 100 can include labeled video 110 and unlabeled video 120. The labeled video 110 can include $3^{rd}$ person video. The labeled video 110 can be from any number of sources, e.g., a building mounted camera, an overhead camera, a camera mounted on a drone, plane, or satellite. The labeled video 110 has been analyzed and labeled for the content in the video. The unlabeled video 120 can include $1^{st}$ person video. The unlabeled video 120 can be from any number of sources, e.g., a bodycam, glasses with an imbedded camera, a dashcam, a head-mounted camera, a mobile device, or a camera vest with multiple cameras, etc. The unlabeled video 120 has not been previously analyzed and labeled for the content in the video.

The labeled video 110 and the unlabeled video 120 can feed into a feature extraction system 130. The feature extraction system 130 can extract features from frames of both the labeled video 110 and the unlabeled video 120. The extracted features can be fed into a feature aggregation system 140 and a domain adversarial training system 150. The feature aggregation system 140 can produce a vector representation 160 of the video from the extracted features. The vector representation 160 of the video can be classified as an activity 170. The domain adversarial training system 150 can include a frame-wise discriminator 152 and a video-wise discriminator 154.

In one embodiment, the frame-wise discriminator 152 can be employed to reduce the representation differences between two domains, e.g., labeled videos and unlabeled videos or first-person videos and third-person videos. The discriminator can learn differences between two domains at the frame-level and backpropagate the error signals to update CNN to reduce the representation differences. The discriminator can follow:

$$\max_{D} \sum_{t} \log D(f_t(V^{3rd})) + \log(1 - D(f_t(V^{1st})))$$

$$\max_{\{f_t\}} \sum_{t} \log D(f_t(V^{1st})),$$

where D is the domain discriminator, t is time, $V^{1st}$ is the first-person or unlabeled video, $V^{3rd}$ is the third-person or labeled video, and $f_t$ is a video feature representation.

In another embodiment, the video-wise discriminator 154 can be employed to reduce the representation differences between two domains. The discriminator learns differences between two domains at the video-level, i.e., after feature aggregation, and backpropagate the error signals to update both CNN and feature aggregation parameters. The discriminator can follow:

$$\max_{D} \log D(f_t(V^{3rd})) + \log(1 - D(f_t(V^{1st})))$$

$$\max_{\{f_t\}} \log D(f_t(V^{1st})),$$

where D is the domain discriminator, t is time, $V^{1st}$ is the first-person or unlabeled video, $V^{3rd}$ is the third-person or labeled video, and $f_t$ is a video feature representation. Here, $f_t$ is the representation at a $t^{th}$ time frame and the desired vector representation 160 is aggregated over all time frames.

Figure 3:
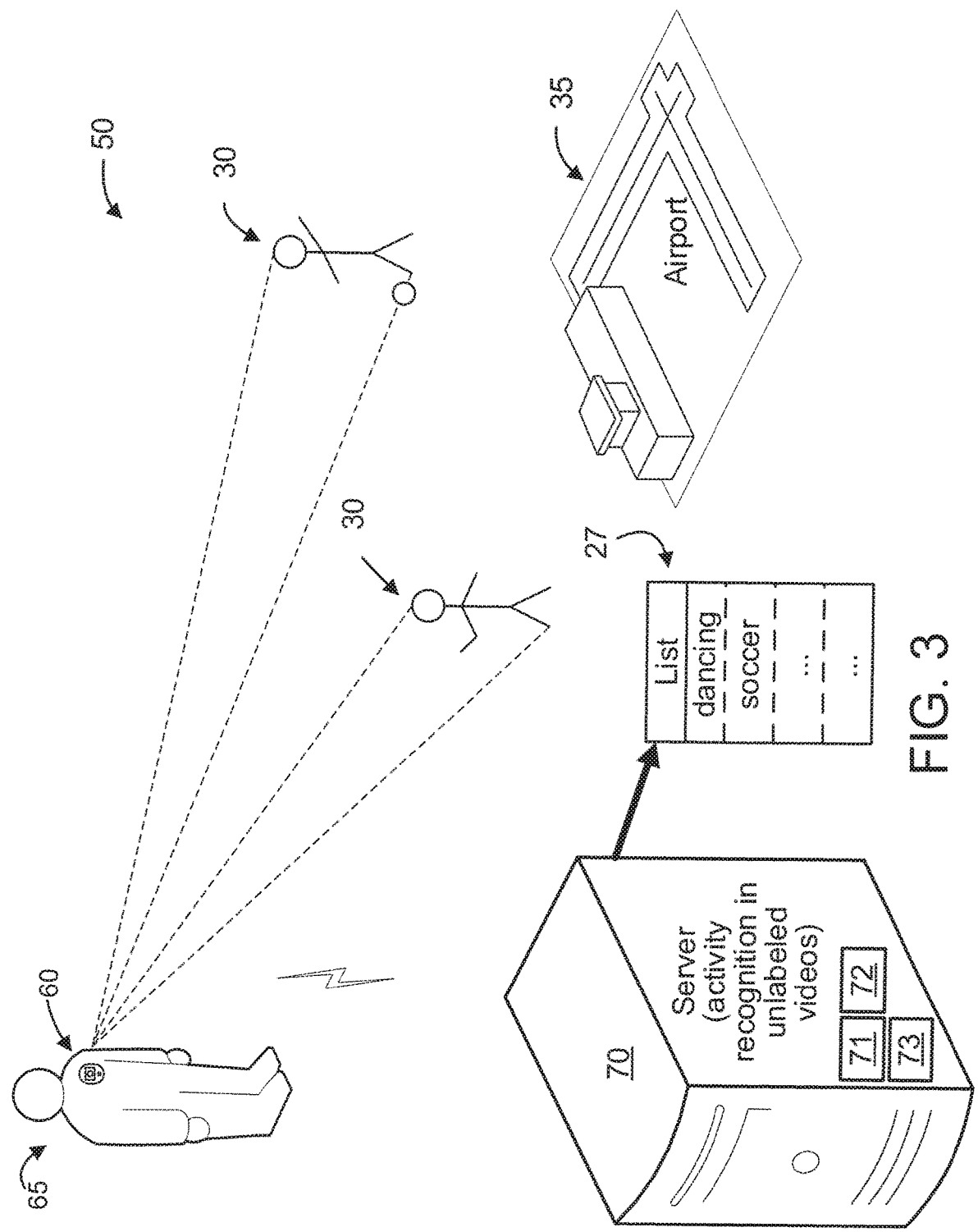
FIG. 3 shows an exemplary system for a surveillance system with activity recognition, in accordance with an embodiment of the present invention.

FIG. 3 shows an exemplary system 50 for a surveillance system with activity recognition, in accordance with an embodiment of the present invention. The system 50 includes a camera system 60. While a single camera system 60 is shown in FIG. 3 for the sakes of illustration and brevity, it is to be appreciated that multiple camera systems can be also used, while maintaining the spirit of the present invention. In one embodiment, the camera system 60 can include a bodycam. In another embodiment, the camera system 60 can include glasses with an imbedded camera, a dashcam, a head-mounted camera, a camera vest with multiple cameras in the vest, or any other camera system.

The camera system 60 is mounted on a security mount 65. For the sake of illustration, the mounting entity 65 is a security officer. While a security officer 65 is shown (as a mounting entity) for the sake of illustration, any other mounting entity can be used, as readily appreciated by one of ordinary skill in the art given the teachings of the present invention provided herein, while maintaining the spirit of the present invention. For example, the camera system 60 can be mounted in or on any of the following: a drone, a security patrol vehicle; and so forth. The preceding examples are merely illustrative.

The camera system 60 can be a wireless camera system having its own antenna(s) or can use one or more antennas included on the security mount 65 (or other mounting entity (e.g., building, drone, etc.) to which the camera system 60 is mounted or proximate).

The system 50 further includes a server 70 configured to perform activity recognition. Such activity recognition can be with respect to a secured object such as, for example, a facility 35. The facility 35 can be a secured facility or a non-secured facility. In the example of FIG. 3, the facility 35 is a secured facility implemented as an airport. Of course, other facilities (e.g., mass transit hub, sports complex, etc.) can also be monitored with respect to activity recognition in unlabeled videos in accordance with the present invention. The activity recognition can involve detecting the presence of objects 30 (e.g., persons), recognizing particular activity performed by the objects 30 and/or particular activity performed by one or more persons using the objects 30, and/or performing one or more activity (e.g., in response to activity recognition results). The server 70 can be located remote from, or proximate to, the camera system 60. The server 70 can include a processor 71, a memory 72, and a wireless transceiver 73. The processor 71 and the memory 72 of the remote server 70 can be configured to perform surveillance based on images received from the camera system 60 by the (the wireless transceiver 73 of) the remote server 70. In this way, a list 27 of recognized activities can be provided for any of a myriad of possible application uses relating to activity recognition. Such application uses can involve one or more activity performed responsive to the list, as readily appreciated by one of ordinary skill in the art. For example, an alert (local and/or remote) can be provided, one or more doors and/or windows can be closed and locked to secure the person within a specific area or to keep the person from (out of) that specific area, a person containment procedure can be automatically performed, and so forth.

Accordingly, some exemplary suitable environments to which the present invention can be applied can include any environments where activity recognition can prove useful such as mass transit hubs, border crossings, subways, transportation hubs, airports, ship ports, sports facilities, and so forth. It is to be appreciated that the preceding environments are merely illustrative and, thus, other environments can also be used, while maintaining the spirit of the present invention.

Any activity type of interest can be recognized, depending upon the implementation. For example, the activity may include, but is not limited to, one or more of the following: an intruder running up to a premises or an object; a projectile approaching the premises or the object; a sporting activity; a prohibited activity (e.g., holding a weapon in a place where weapons are prohibited except for, e.g., law enforcement, etc.); a potentially dangerous activity; and so forth. It is to be appreciated that the preceding activity s are merely illustrative.

Figure 4:
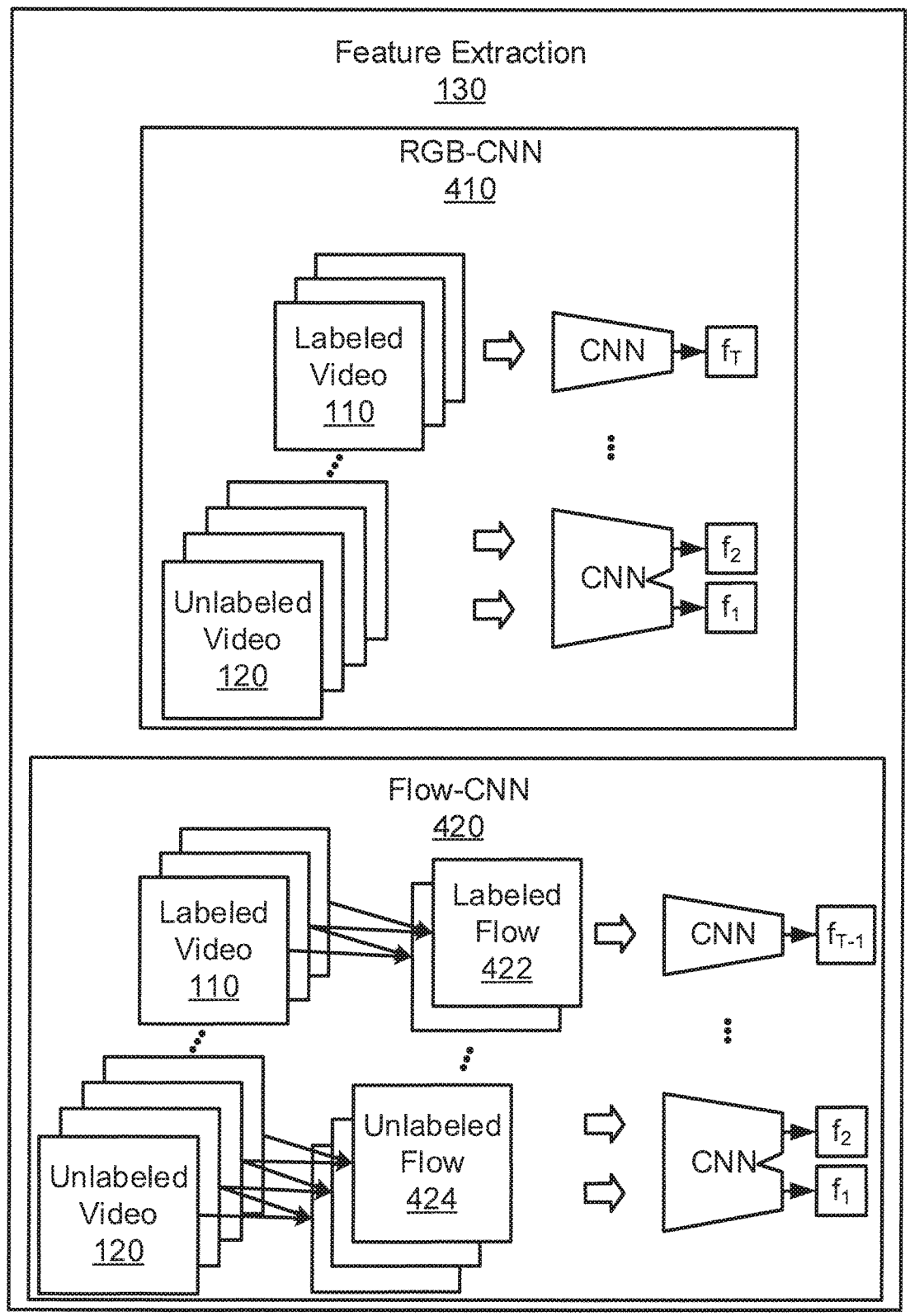
FIG. 4 shows a block diagram illustrating a feature extraction system for activity recognition in video, in accordance with an embodiment of the present invention.

FIG. 4 shows a block diagram illustrating a feature extraction system 130 for activity recognition in video, in accordance with an embodiment of the present invention.

The feature extraction system 130 can utilize three-dimensional (3D) convolutional neural networks (CNN) from both the red-green-blue (RGB) and optical flow data.

In one embodiment, the feature extraction system 130 can include a RGB-CNN 410. The RGB-CNN 410 can process the labeled video 110 and the unlabeled video 120 through CNN designed to extract vectors of video frames related to the red-blue-green aspects of the frames. The RGB-CNN 410 can produce vector representations of frames of the labeled video 110 and the unlabeled video 120.

In another embodiment, the feature extraction system 130 can include a Flow-CNN 420. The Flow-CNN 420 can process the labeled video 110 and the unlabeled video 120 to produce labeled flow 422 and unlabeled flow 424. Then the Flow-CNN 420 can process the labeled flow 422 and unlabeled flow 424 through CNN designed to extract vectors of video frames related to the flow of the frames. The Flow-CNN 420 can produce vector representations of frames of the labeled video 110 and the unlabeled video 120.

Figure 5:
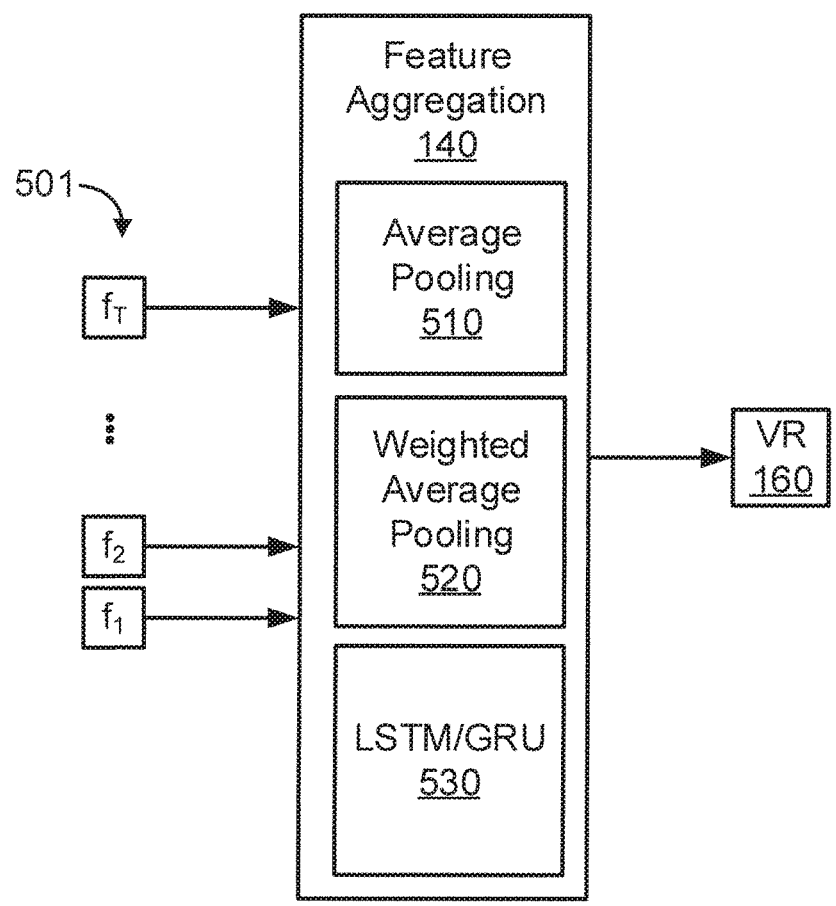
FIG. 5 shows a block diagram illustrating a feature aggregation system for activity recognition in video, in accordance with an embodiment of the present invention.

FIG. 5 shows a block diagram illustrating a feature aggregation system 140 for activity recognition in video, in accordance with an embodiment of the present invention. The feature aggregation system 140 is utilized to convert vector representations of frames 501 from the video into a single vector representation 160 of the video. In one embodiment, the feature aggregation system 140 can include an averaging pool 510. The averaging pool 510 can take the average of the vector representations of frames 501 with the following equation:

$$f = \frac{1}{T}\sum_{t=1}^{T} f_t,$$

with $f_t$ being the vector representation of a frame and T being the total number of frames.

In another embodiment, the feature aggregation system 140 can include a weighted averaging pool 520. The weighted averaging pool 520 can take the weighted average of the vector representations of frames 501 with the following equation:

$$f = \frac{1}{T}\sum_{t=1}^{T} \alpha_t f_t, \; \alpha_t = g(f_t), \; \sum_{t=1}^{T} \alpha_t = 1,$$

with $f_t$ being the vector representation of a frame, $\alpha_t$ being a weighting factor, and T being the total number of frames.

In yet another embodiment, the feature aggregation system 140 can include a long short-term memory network and/or gated recurrent unit network (LSTM/GRU) 530. The LSTM/GRU 530 can process the vector representations of frames 501 with the LSTM network, the GRU network, or a combination of the LSTM/GRU networks like the following equation:

$$f = \text{LSTM/GRU}(f_1, \ldots, f_T),$$

with $f_t$ being the vector representation of a frame, LSTM/GRU is a long short-term memory network and/or gated recurrent unit network, and T being the total number of frames.

In one embodiment, the feature aggregation system 140 can include a combination of the averaging pool 510, the weighted averaging pool 520, and the LSTM/GRU 530.

Figure 6:
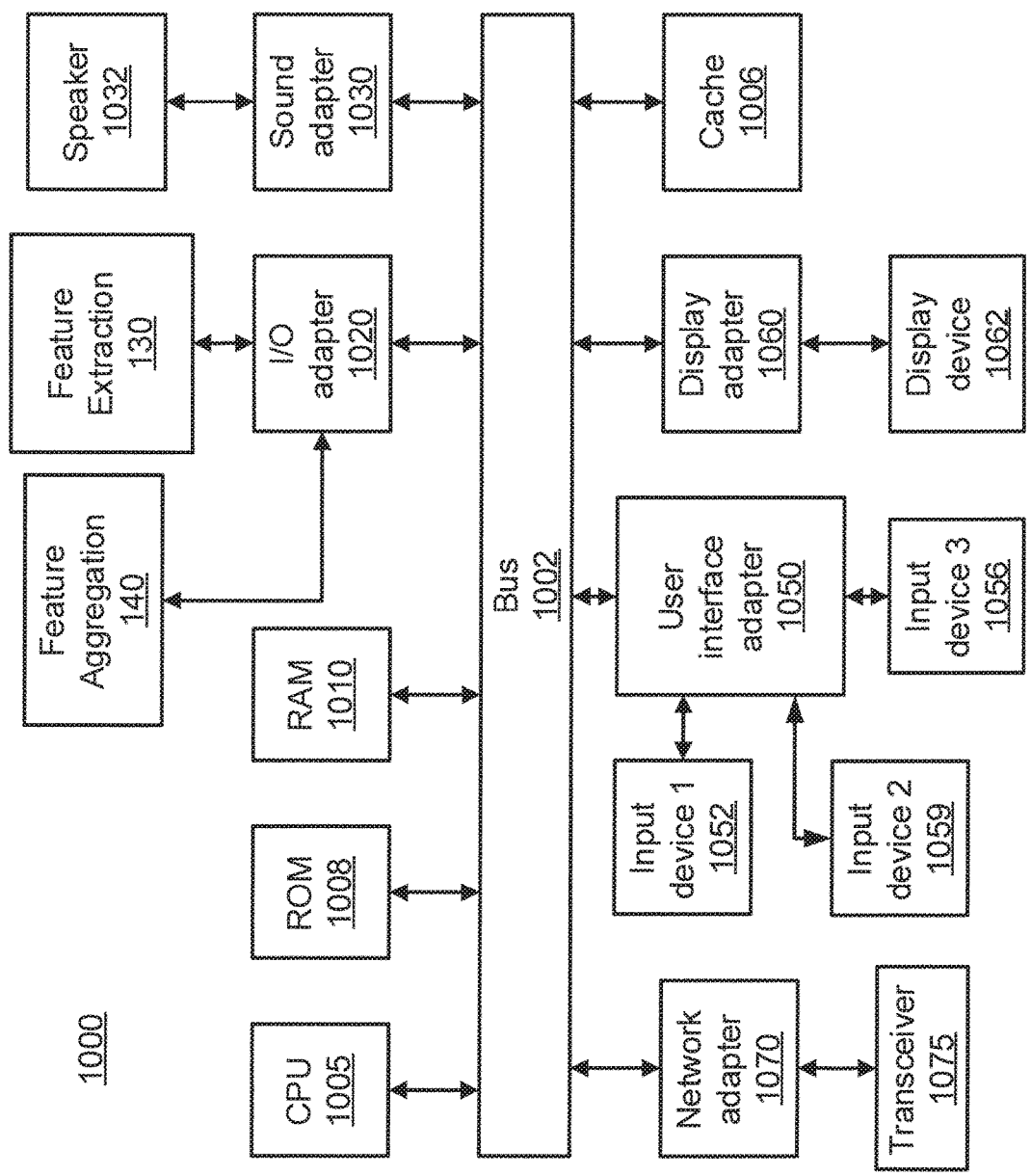
FIG. 6 shows a block diagram of a computer processing system, to be used for activity recognition, in accordance with an embodiment of the present invention.

Referring now to FIG. 6, a block diagram of a computer processing system 1000, for activity recognition in video, is illustratively depicted in accordance with an embodiment of the present principles. The computer system 1000 includes at least one processor (CPU) 1005 operatively coupled to other components via a system bus 1002. A cache 1006, a Read Only Memory (ROM) 1008, a Random-Access Memory (RAM) 1010, an input/output (I/O) adapter 1020, a sound adapter 1030, a network adapter 1070, a user interface adapter 1050, and a display adapter 1060, are operatively coupled to the system bus 1002.

A feature extraction system 130 and a feature aggregation system 150 can be operatively coupled to system bus 1002 by the I/O adapter 1020. The systems 130 and 150 can be employed to extract and aggregate features from within videos to recognize activities in the videos.

A speaker 1032 may be operatively coupled to system bus 1002 by the sound adapter 1030. The speaker 1032 can sound an alarm when controlled. A transceiver 1075 is operatively coupled to system bus 1002 by network adapter 1070. A display device 1062 is operatively coupled to system bus 1002 by display adapter 1060.

A first user input device 1052, a second user input device 1059, and a third user input device 1056 are operatively coupled to system bus 1002 by user interface adapter 1050. The user input devices 1052, 1059, and 1056 can be any of a sensor, a keyboard, a mouse, a keypad, a joystick, an image capture device, a motion sensing device, a power measurement device, a microphone, a device incorporating the functionality of at least two of the preceding devices, and so forth. Of course, other types of input devices can also be used in the present invention. The user input devices 1052, 1059, and 1056 can be the same type of user input device or different types of user input devices. The user input devices 1052, 1059, and 1056 are used to input and output information to and from system 1000.

Of course, the computer system 1000 may also include other elements (not shown), as readily contemplated by one of skill in the art, as well as omit certain elements. For example, various other input devices and/or output devices can be included in computer system 1000, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the computer system 1000 are readily contemplated by one of ordinary skill in the art given the teachings of the present invention provided herein.

Moreover, the computer processing system 1000 can be configured to initiate an action (e.g., a control action) on a controlled system, machine, and/or device responsive to a recognized activity. Such action can include, but is not limited to, one or more of: powering down the controlled system, machine, and/or device or a portion thereof; powering down, e.g., a system, machine, and/or a device that is affected by the activity of another device, stopping a centrifuge being operated by a user before an imbalance in the centrifuge causes a critical failure and harm to the user, securing an automatic door, labeling the video with the recognized activity and storing the video in a location for the activity, and so forth. As is evident to one of ordinary skill in the art, the action taken is dependent upon the type of controlled system, machine, and/or device to which the action is applied.

Figure 8:
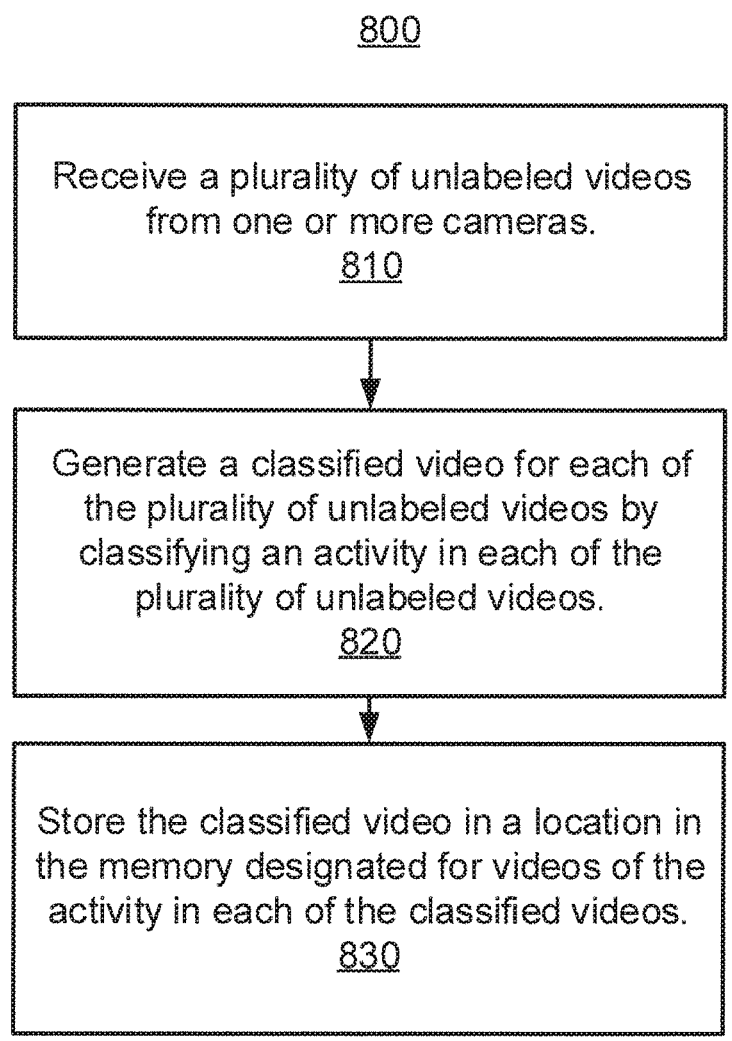
FIG. 8 shows a block diagram illustrating a method for activity recognition in a mobile device, in accordance with an embodiment of the present invention.
Figure 9:
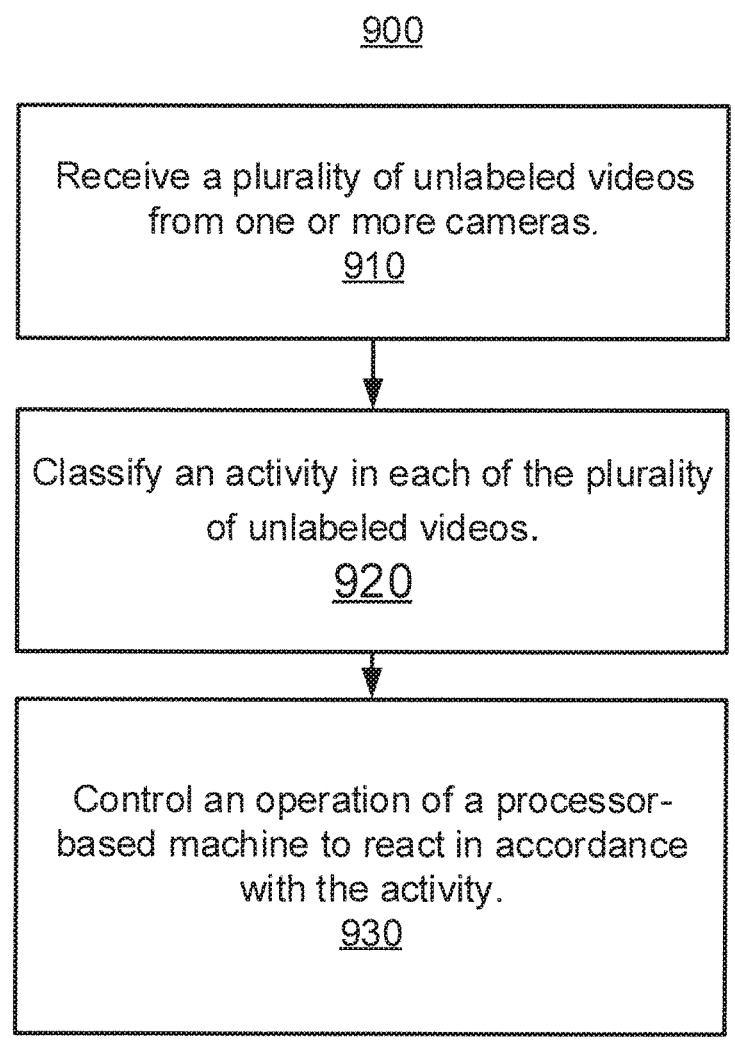
FIG. 9 shows a block diagram illustrating a method for activity recognition in a surveillance system, in accordance with an embodiment of the present invention.

Further, it is to be appreciated that computer processing system 1000 may perform at least part of the method described herein including, for example, at least part of method 700 of FIG. 7 and/or at least part of method 800 of FIG. 8 and/or at least part of method 900 of FIG. 9.

Referring now to FIG. 7, a block diagram illustrating a method for activity recognition, in accordance with an embodiment of the present invention. In block 710, receive a plurality of videos, the plurality of videos including labeled videos and unlabeled videos. In block 720, extract, with a feature extraction convolutional neural network (CNN), frame features for frames from each of the plurality of videos. In block 730, estimate, with a feature aggregation system, a vector representation for one of the plurality of videos responsive to the frame features. In block 740, classify an activity from the vector representation. In block 750, control an operation of a processor-based machine to change a state of the processor-based machine, responsive to the activity.

Referring now to FIG. 8, a block diagram illustrating a method for activity recognition in a mobile device, in accordance with an embodiment of the present invention. In block 810, receive a plurality of unlabeled videos from one or more cameras. In block 820, generate a classified video for each of the plurality of unlabeled videos by classifying an activity in each of the plurality of unlabeled videos. In block 830, store the classified video in a location in the memory designated for videos of the activity in each of the classified videos.

Referring now to FIG. 9, a block diagram illustrating a method for activity recognition in a surveillance system, in accordance with an embodiment of the present invention. In block 910, receive a plurality of unlabeled videos from one or more cameras. In block 920, classify an activity in each of the plurality of unlabeled videos. In block 930, control an operation of a processor-based machine to change a state of the processor-based machine, responsive to the activity.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A mobile device utilizing activity recognition, the mobile device comprising:
   one or more cameras;
   a processor and memory coupled to the processor, the processing system programmed to:
   receive a plurality of unlabeled videos from the one or more cameras;
   generate a classified video for each of the plurality of unlabeled videos by classifying an activity in each of the plurality of unlabeled videos; and
   store the classified video in a location in the memory designated for videos of the activity in each of the classified videos,
   wherein the processing system is further programmed to utilize domain adversarial training system to generate the classified video, and
   wherein the domain adversarial training system employs a frame-wise discriminator to learn differences between classified videos and the unlabeled videos at the frame level and to backpropagate the differences into a feature extraction CNN and a feature aggregation system.

2. The mobile device as recited in claim 1, further includes a communication system.

3. The mobile device as recited in claim 2, wherein the communication system connects to a remote server that creates the classified video.

4. The mobile device as recited in claim 1, wherein the unlabeled video includes first person video.

5. The mobile device as recited in claim 1, wherein the processing system is further programmed to employ a red-green-blue convolution neural network (CNN) to generate the classified video.

6. The mobile device as recited in claim 1, wherein the processing system is further programmed to employ a flow CNN to generate the classified video.

7. The mobile device as recited in claim 1, wherein the processing system is further programmed to determine an average of the frame features to generate the classified video.

8. The mobile device as recited in claim 1, wherein the processing system is further programmed to determine a weighted average of the frame features responsive to a weighting factor to generate the classified video.

9. The mobile device as recited in claim 1, wherein the processing system is further programmed to employ a short-term memory neural network to generate the classified video.

10. The mobile device as recited in claim 1, wherein the processing system is further programmed to employ a gated recurrent unit network to generate the classified video.

11. The mobile device as recited in claim 1, wherein the domain adversarial training system employs a video-wise discriminator to learn differences between classified videos and the unlabeled videos after the estimating at the video level after the estimating and to backpropagate the differences into a feature extraction CNN and a feature aggregation system.

12. The mobile device as recited in claim 1, wherein the mobile device is a smart phone.

13. A computer program product for a mobile device with activity recognition, the computer program product comprising a non-transitory computer readable storage medium having program instructions embodied therewith, the program instructions executable by a computer to cause the computer to perform a method comprising:
   receiving a plurality of unlabeled videos from one or more cameras;
   generating a classified video for each of the plurality of unlabeled videos by classifying an activity in each of the plurality of unlabeled videos; and
   storing the classified video in a location in a memory designated for videos of the activity in each of the classified videos,
   wherein the plurality of unlabeled videos includes first-person videos, and
   wherein the generating determines an average of the frame features, determines a weighted average of the frame features responsive to a weighting factor, and employs both a short-term memory neural network and a gated recurrent unit network.

14. A computer-implemented method for activity recognition in a mobile device, the method comprising:
receiving a plurality of unlabeled videos from one or more cameras;
generating a classified video for each of the plurality of unlabeled videos by classifying an activity in each of the plurality of unlabeled videos; and
storing the classified video in a location in a memory designated for videos of the activity in each of the classified videos,
wherein the plurality of unlabeled videos includes first-person videos, and
wherein the generating determines an average of the frame features, determines a weighted average of the frame features responsive to a weighting factor, and employs both a short-term memory neural network and a gated recurrent unit network.

15. The computer-implemented method as recited in claim 14, wherein generating employs a frame-wise discriminator to learn differences between the classified videos and the unlabeled videos at the frame level to backpropagate the differences into a feature extraction CNN and a feature aggregation system.

16. The computer-implemented method as recited in claim 14, wherein generating employs a video-wise discriminator to learn differences between the classified videos and the unlabeled videos at the video level to backpropagate the differences into a feature extraction CNN and a feature aggregation system.

* * * * *